(12) United States Patent
Kim

(10) Patent No.: US 12,070,777 B2
(45) Date of Patent: Aug. 27, 2024

(54) CAPSULE INSPECTION SYSTEM AND METHOD

(71) Applicant: CHANGSUNG SOFTGEL CO., LTD, Pocheon-si (KR)

(72) Inventor: Ju-Su Kim, Seoul (KR)

(73) Assignee: CHANGSUNG SOFTGEL CO., LTD, Pocheon-si (KR)

( * ) Notice: Subject to any disclaimer, the term of this patent is extended or adjusted under 35 U.S.C. 154(b) by 0 days.

(21) Appl. No.: 18/078,673

(22) Filed: Dec. 9, 2022

(65) Prior Publication Data

US 2023/0106500 A1 Apr. 6, 2023

Related U.S. Application Data

(63) Continuation of application No. PCT/KR2021/007362, filed on Jun. 11, 2021.

(30) Foreign Application Priority Data

Jun. 15, 2020 (KR) .................. 10-2020-0072619

(51) Int. Cl.
*B07C 5/342* (2006.01)
*B07C 5/36* (2006.01)
*G06T 7/00* (2017.01)
*G06T 7/13* (2017.01)

(52) U.S. Cl.
CPC ............ *B07C 5/3422* (2013.01); *B07C 5/362* (2013.01); *B07C 5/366* (2013.01); *G06T 7/0008* (2013.01); *G06T 7/13* (2017.01); *G06T 2200/24* (2013.01)

(58) Field of Classification Search
CPC .................................................. B07C 5/3422
See application file for complete search history.

(56) References Cited

U.S. PATENT DOCUMENTS

| | | | | |
|---|---|---|---|---|
| 6,108,030 A | * | 8/2000 | Yamamoto | G01N 21/9508 209/939 |
| 2011/0297590 A1 | * | 12/2011 | Ackley | G01N 21/8806 209/552 |
| 2019/0236371 A1 | * | 8/2019 | Boonmee | G06V 10/764 |

OTHER PUBLICATIONS

OEM Ford, Drive Plate—Ford, https://www.oemfordpart.com/oem-parts/ford-drive-plate-kr3z6477a?origin=pla&srsltid=AfmBOoqDlpcVgZerm6gZj91Kro1WxjOQCckrYt5iyr6F_A-OOn52wLNrZ48#google_vignette (Year: 2020).*

* cited by examiner

*Primary Examiner* — Jacob S. Scott
*Assistant Examiner* — Miraj T. Patel
(74) *Attorney, Agent, or Firm* — Jefferson IP Law, LLP

(57) ABSTRACT

The present invention relates to an inspection system for confirming whether a capsule is defective and, more particularly, a large quantity of capsules flowing in from the outside is randomly supplied to a moving part by means of a hopper part, the moving part transfers, to a discharge part by means of a plurality of rollers, the large quantity of capsules fed by means of the hopper part so that a controller can distinguish between the good-quality and defective capsules on the basis of an image captured by means of a vision part and discharge same, a gap is formed between the rollers so that the plurality of fed capsules are randomly loaded and horizontally aligned in the gap, and the vision part can capture still images of the rotating capsules that are horizontally aligned and loaded in the gap, while the rollers rotate/stop through a driving part according to the repeated going/stopping of the moving part.

10 Claims, 12 Drawing Sheets

FIG. 3
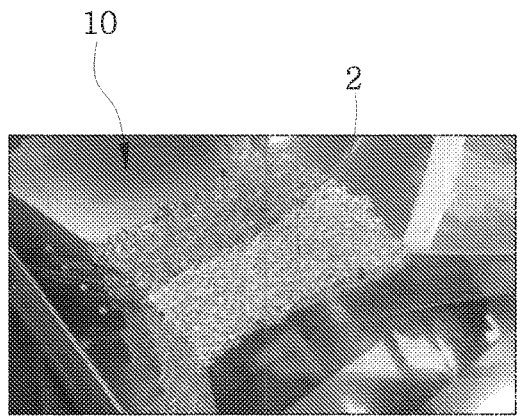
FIG. 4
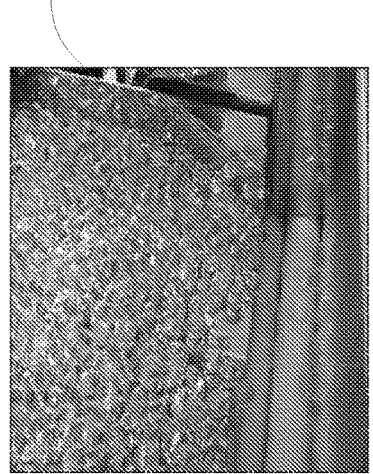
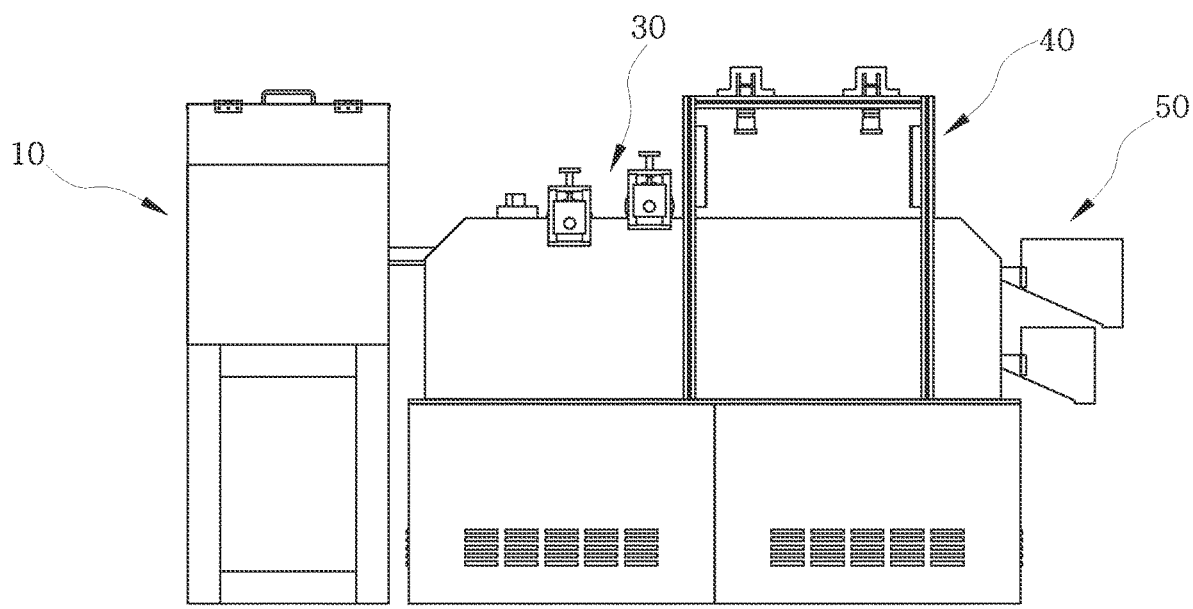
FIG. 5

FIG. 15
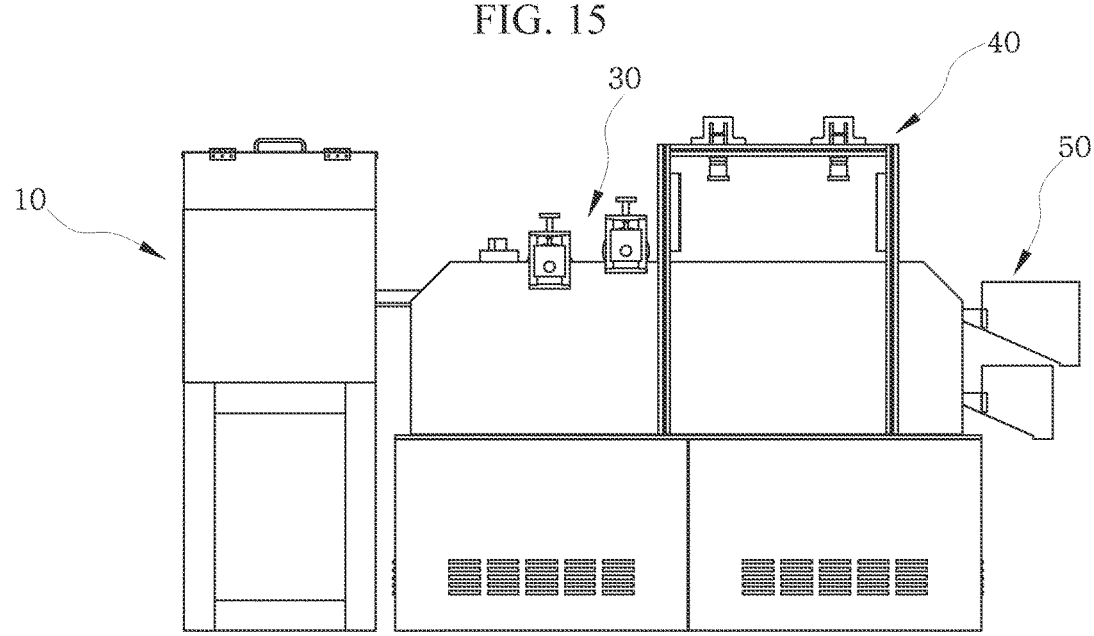
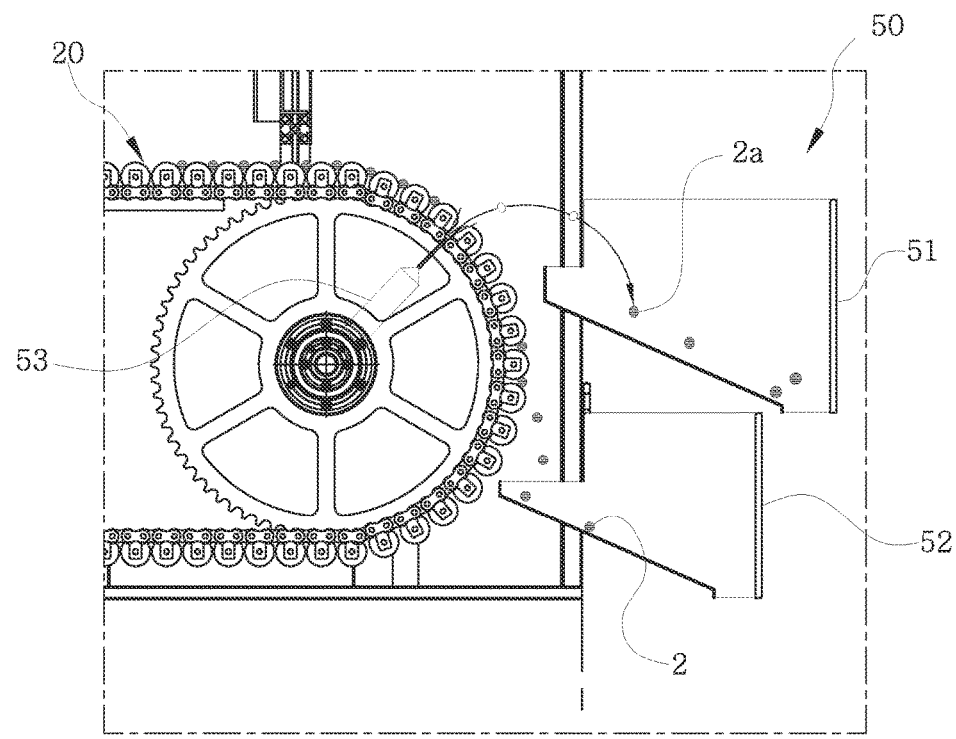
FIG. 16

CAPSULE INSPECTION SYSTEM AND METHOD

CROSS-REFERENCE TO RELATED APPLICATION(S)

This application is a continuation application, claiming priority under § 365(c), of an International application No. PCT/KR2021/007362, filed on Jun. 11, 2021, which is based on and claims the benefit of a Korean patent application number 10-2020-0072619, filed on Jun. 15, 2020, in the Korean Intellectual Property Office, the disclosure of which is incorporated by reference herein in its entirety.

TECHNICAL FIELD

The present invention relates to an inspection system for confirming whether a capsule is defective or not, and more particularly, to an inspection system in which replacement of a rotation drum or a jig according to a model (type) of a capsule is not required, and a large amount of capsules that are randomly aligned are rotated to confirm whether the capsule is defective or not in all directions.

BACKGROUND ART

In general, medicines or health foods that are refined in a liquid or powder phase may be accommodated in capsules. Due to such encapsulation, a fixed dose of the medicine or the health food, which is refined in a liquid or powder phase, may be administered, and the administration may be facilitated.

In addition, since the capsules are formed of a soft material while being formed of a material that melts by saliva or the like to expose medicinal fluids or powder upon the administration, the capsules may be damaged midway, so that the capsules may be packaged in a container after being subject to a separate inspection process.

In other words, after a large amount of capsules are manufactured through a capsule manufacture device, oil or foreign substances may be attached to a surface of the capsule due to characteristics of a viscous gelatin sheet, so that the large amount of capsules may be stored in a large container after being separately subject to a washing process and a drying process. In addition, the capsules may be introduced into a hopper so as to be seated in seating holes of a jig or a rotation drum (hereinafter collectively referred to as "rotation drum") in one-to-one correspondence by a vibrator, and a vision or the like may confirm whether each of the capsules is defective or not upon transfer of the capsules.

In this case, since an inspection device is configured such that the seating hole of the rotation drum and the capsule have the same size and the same shape in order to prevent the capsule from fluctuating, when the shape or the size of the capsule is changed, an entire rotation drum or an entire jig had to be replaced.

Furthermore, since the vision may partially capture only a front surface of the capsule, another rotation drum engaged with the rotation drum to rotate has been provided to allow the capsule of the rotation drum to be seated in a seating hole of the another rotation drum in an inverted state, and a rear surface of the capsule has been captured through another vision.

In other words, the inspection device according to the related art has to include a redundant rotation drum and a redundant vision, so that the inspection device may be uneconomical and may have a large volume.

DISCLOSURE

Technical Problem

Therefore, an object of the present invention is to provide a capsule inspection system that may be conveniently used without requiring replacement of a rotation drum or a jig according to a model of a capsule, and may confirm whether the capsule is defective or not in all directions without a separate rotation drum or a separate vision.

Technical Solution

To this end, according to the present invention, a moving part for transferring a capsule may be configured such that rollers are consecutively connected to each other with a gap between the rollers to allow introduced capsules to be seated in a separation gap and horizontally aligned, and shapes of the capsules that are self-rotated as each of the rollers is rotated/stopped according to an operation of the moving part that repeatedly performs going/stopping may be exposed to a bottom of a vision part so as to be captured upon the stopping.

In addition, when determining whether the capsule is a good-quality product or a defective product, the determination may be digitized based on a length value to recognize and determine a large amount of capsules that are randomly introduced.

Advantageous Effects

According to the present invention, various types of capsules may be seated in a separation gap between rollers so as to be horizontally aligned, so that an operation of replacing a jig or a rotation drum for performing one-to-one alignment for each capsule type (size/shape/model, etc.) can be unnecessary.

In addition, according to the present invention, a plurality of capsules that are randomly seated in the separation gap may be self-rotated by the rollers in some sections, so that an entire shape of the capsule rotating in all directions of 360 degrees can be exposed to a vision, and thus inspection can be performed with only one vision.

In addition, according to the present invention, when inspecting whether the capsule is a defective product, a large amount of capsules may be inspected at once based on a length value, so that accuracy and a speed of the inspection can be improved.

Best Mode

The best mode for implementing the present invention is a capsule inspection system, wherein the capsule inspection system includes a hopper part for randomly introducing a large amount of capsules into a moving part, and the moving part including a plurality of rollers consecutively connected to each other while maintaining a separation gap that prevents the capsule from falling out, so that the large amount of capsules randomly introduced by the hopper part are seated in the separation gap between the rollers so as to be transferred to a discharge part, a capsule alignment part for horizontally aligning the large amount of capsules, which are randomly introduced, in the separation gap, a vision part for capturing shapes of the capsules that are horizontally and irregularly aligned in the separation gap by the capsule alignment part, and a controller for determining whether the capsule is a good-quality capsule or a defective capsule based on an image captured by the vision part are provided on an upper portion of the moving part, and the moving part repeatedly performs going/stopping at a predetermined speed to allow each of the rollers to be rotated/stopped by the driving part, such that when the moving part performs the going, each of the rollers is rotated by the driving part to allow the capsules horizontally aligned in the separation gap to rotate, and when the moving part performs the stopping, the rotations of the rollers are stopped so that shapes of the rotated capsules are exposed to a bottom of the vision part so as to be captured and inspected.

DESCRIPTION OF DRAWINGS

FIGS. 3, 4, and 5 are enlarged views showing a hopper part of FIG. 1;

FIGS. 15 and 16 are views showing an operating state of a discharge part of FIG. 1;

MODE FOR INVENTION

Figure 1:
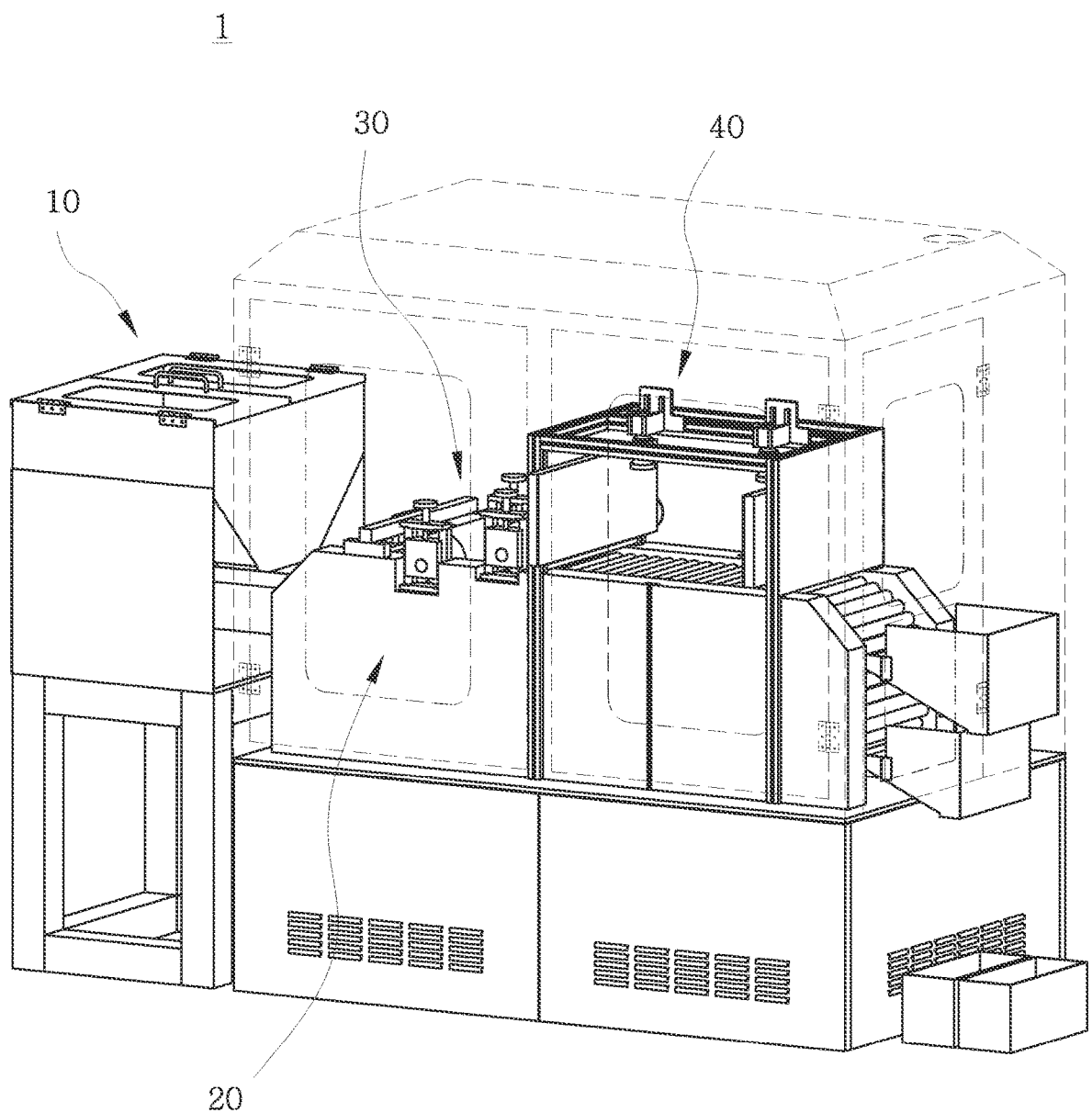
FIG. 1 is a perspective view showing a capsule inspection system according to an embodiment of the present invention.

Hereinafter, specific details for implementing the present invention will be described in detail with reference to the accompanying drawings.

First, terms used in the detailed description and the claims of the present disclosure are not to be interpreted as being limited to dictionary meanings, but to be interpreted into meanings and concepts that are consistent with the technical idea of the present invention.

In addition, it is to be understood that embodiments described in the detailed description of the present disclosure and configurations shown in the drawings are merely exemplary embodiments of the present invention, and modified examples can be made by various equivalents.

Figure 2:
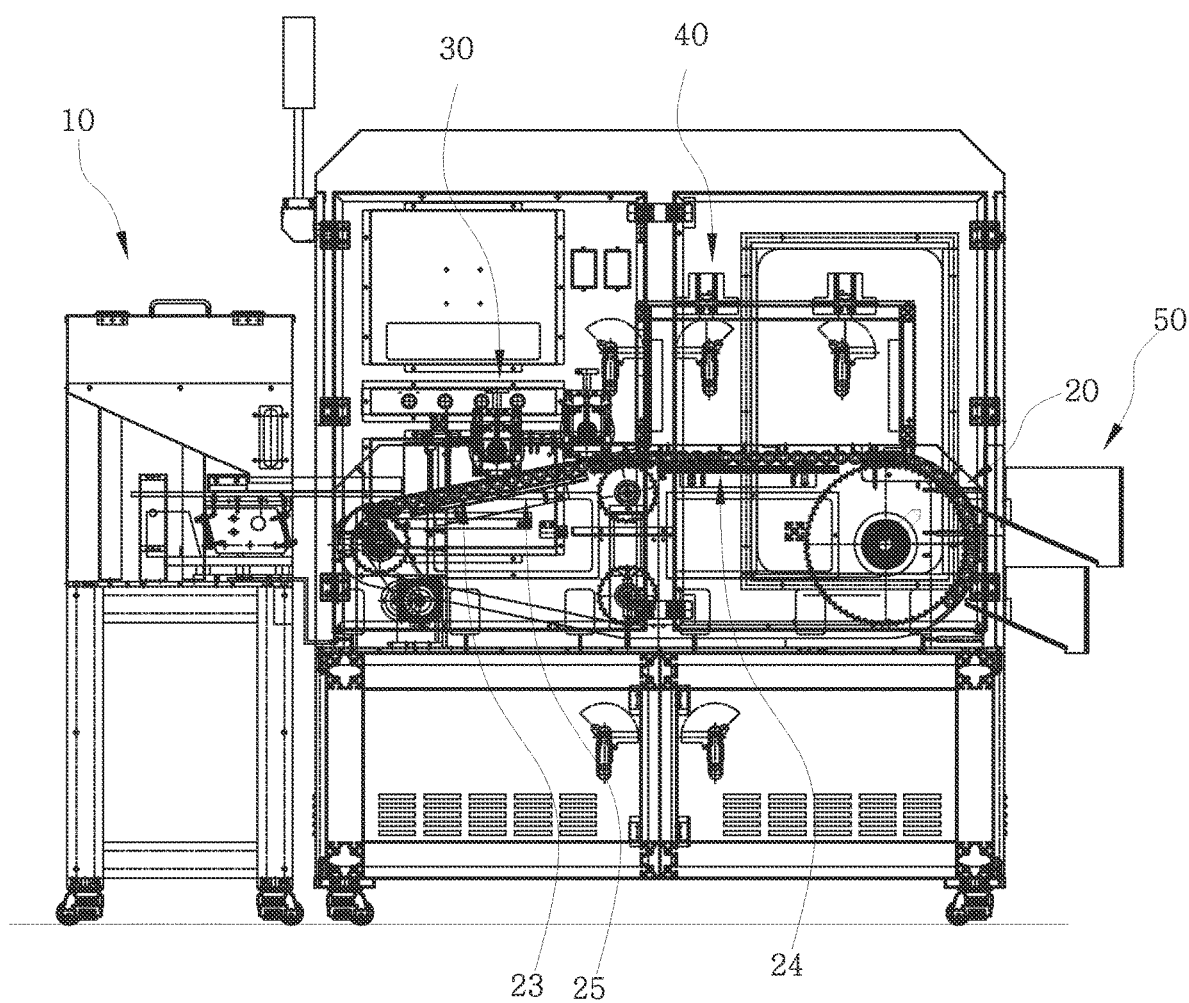
FIG. 2 is a perspective view of FIG. 1.
Figure 6:
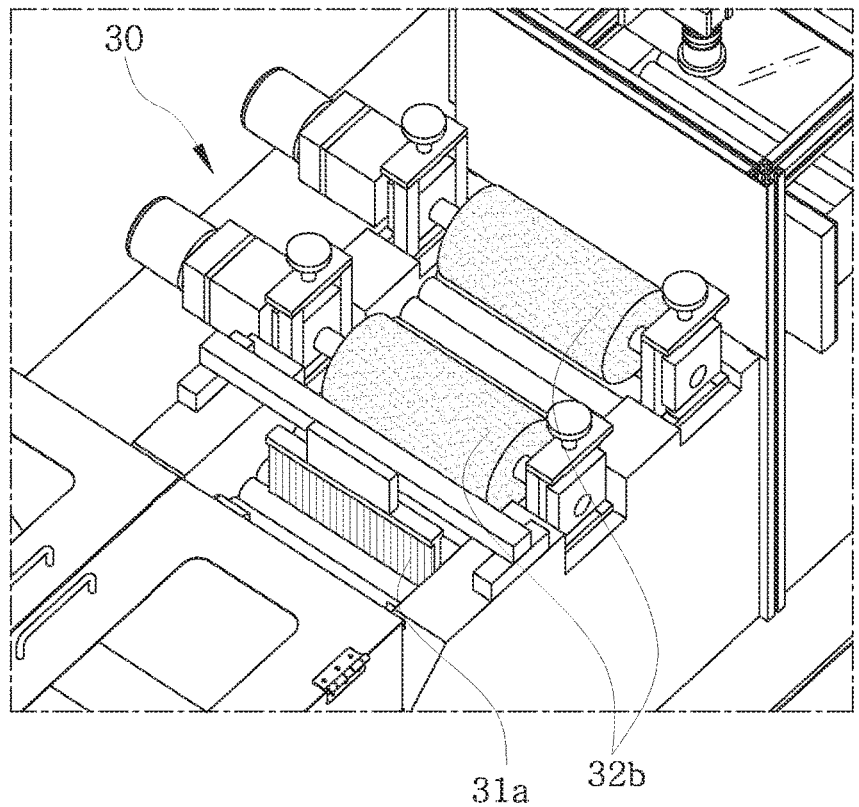
FIGS. 6 and 7 are enlarged views showing a capsule alignment part of FIG. 1.
Figure 7:
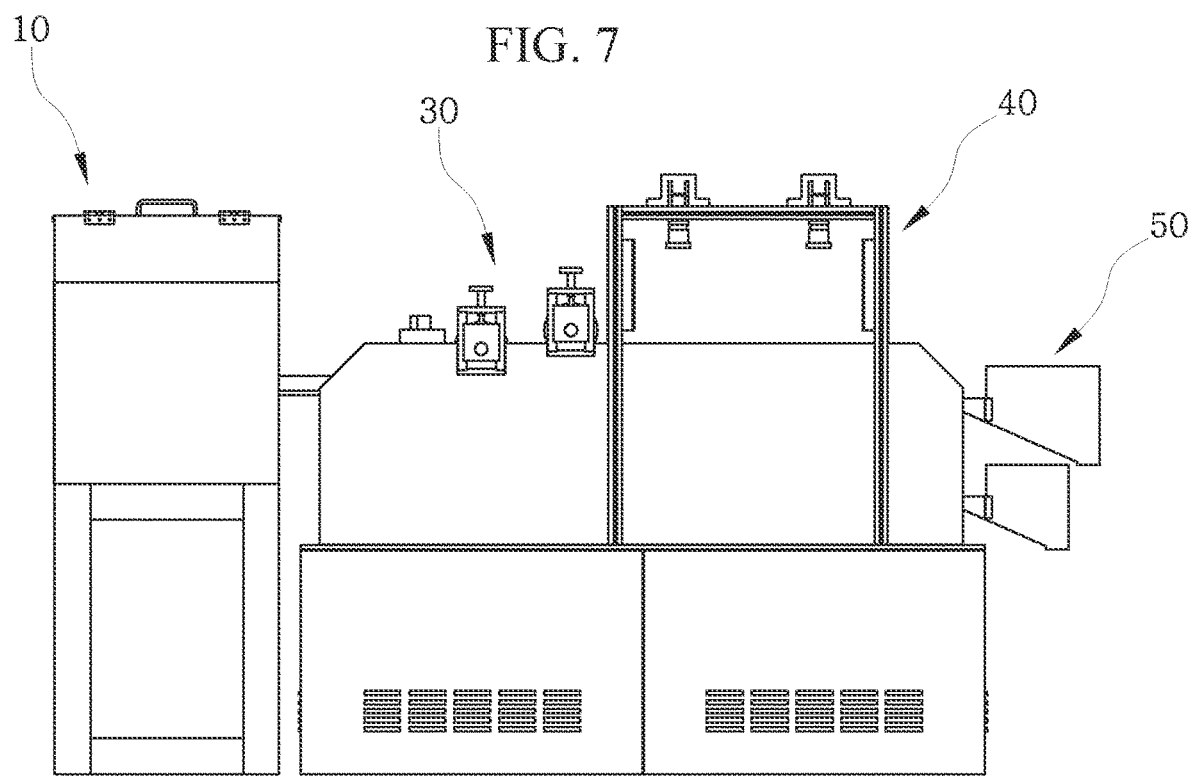
Figure 8:
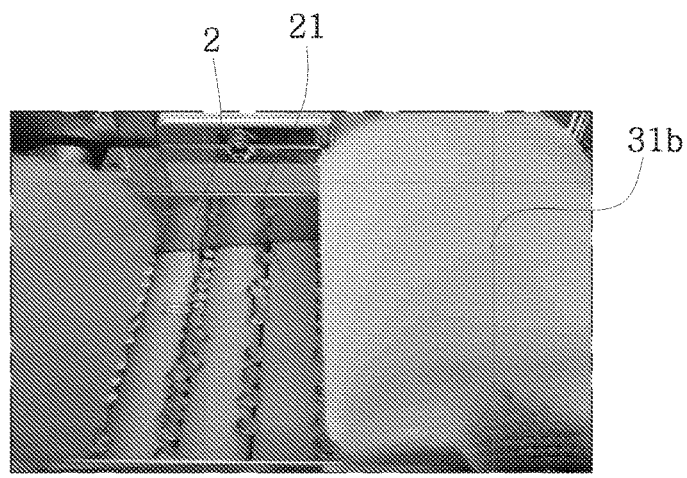
FIGS. 8, 9, 10, and 11 are views showing an operating state of the capsule alignment part of FIGS. 6 and 7.
Figure 9:
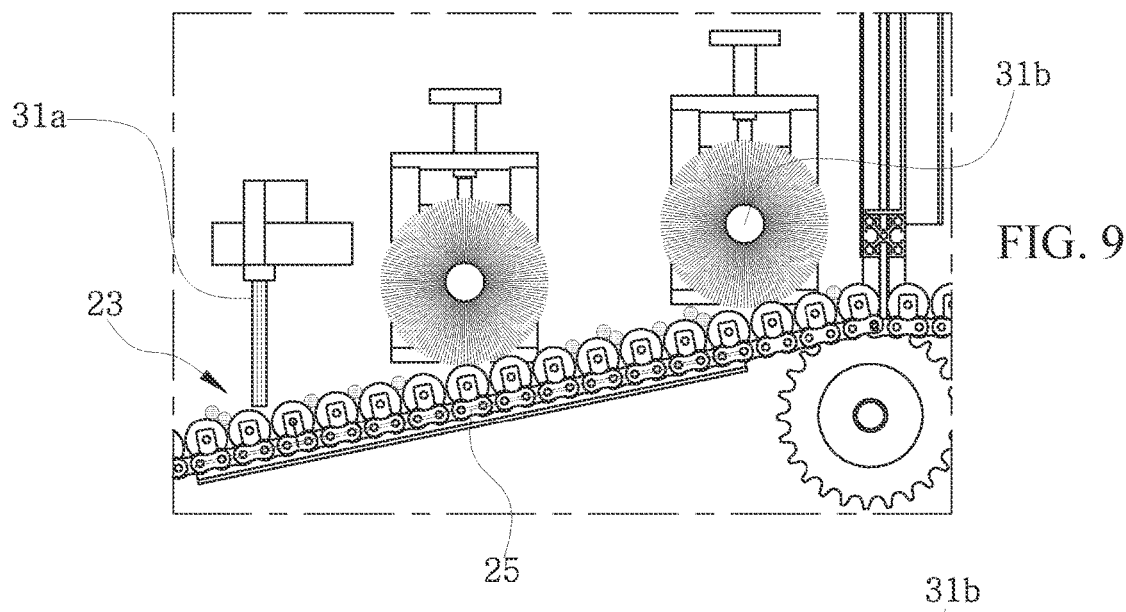
Figures 10, 11:
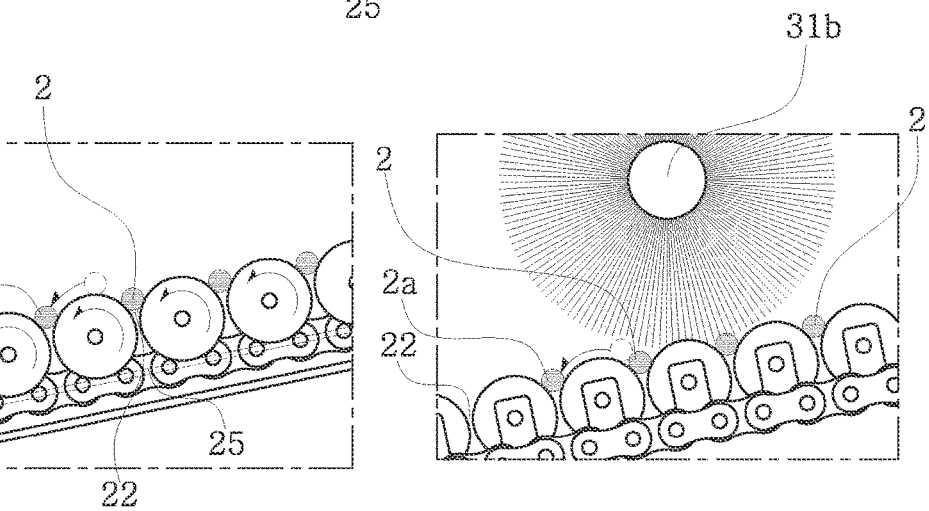
Figure 12:
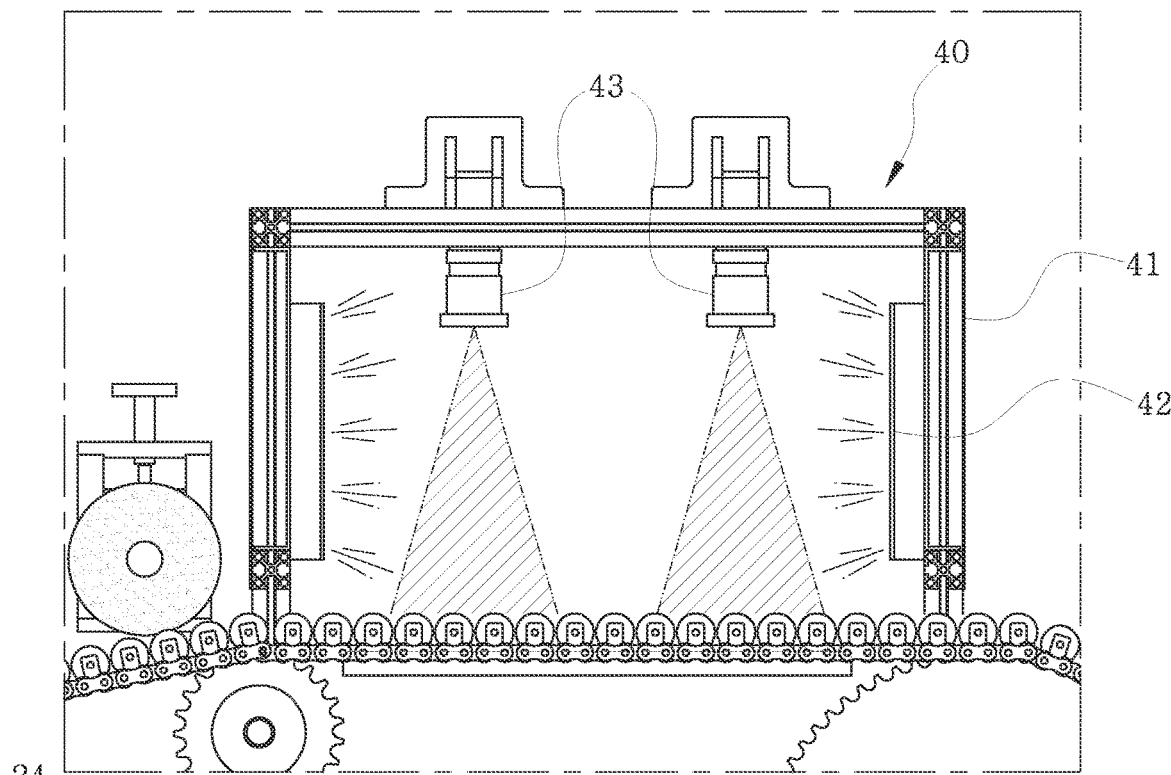
FIGS. 12, 13, and 14 are views showing an operating state of a vision part of FIG. 1.
Figure 13:
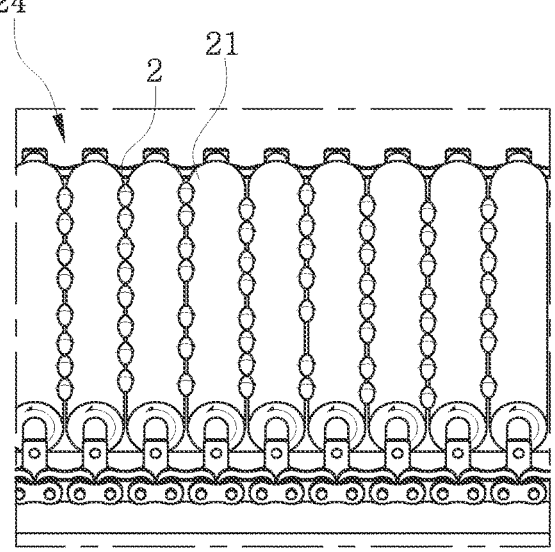
Figure 14:
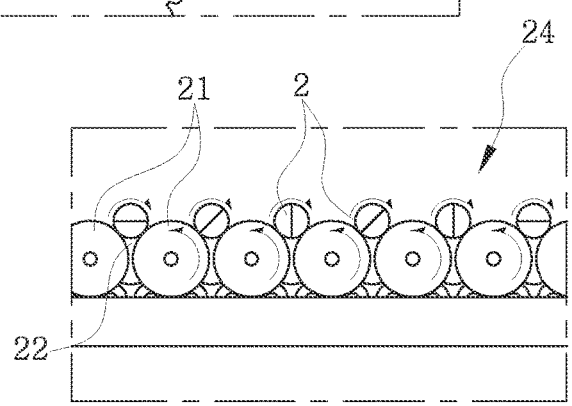

FIGS. 1 and 2 show an overall shape of a capsule inspection system according to an embodiment of the present invention, FIGS. 3, 4 and 5 are enlarged views showing shapes of capsules supplied by a hopper part, FIGS. 6, 7, 8, 9, 10, and 11 views showing a shape of a capsule alignment part, FIGS. 12, 13, 14 are views showing the shapes of the capsules captured by a vision part, and FIGS. 15 and 16 are views showing a state in which good-quality capsules and defective capsules are separately discharged.

As shown in the drawings, according to an embodiment of the present invention, a capsule inspection system may be configured such that a large amount of capsules 2 introduced from an outside are randomly and continuously supplied to a moving part 20 by a hopper part 10, and the moving part 20 includes a plurality of rollers 21 arranged to form a separation gap 22 that prevents the capsule from falling out, so that the large amount of capsules 2 introduced by the hopper part 10 may be randomly located in the separation gap 22 between the rollers so as to be transferred to a discharge part.

In this case, the moving part 20 may move in a predetermined trajectory, and particularly, each of the rollers 21 may be rotated by a driving part 25 when each of the rollers 21 is disposed in a predetermined section, so that the capsules 2 disposed on the roller may be collected and seated in the separation gap 22, and the capsules overlapping each other in the separation gap 22 may be distributed by a capsule alignment part 30 located on an upper portion of the moving part 20 so as to be horizontally aligned.

In addition, the capsules horizontally aligned in the separation gap 22 may be located directly under a bottom of a vision part. In this case, each of the rollers may be rotated in the same direction by the driving part 25, so that the capsules seated in the separation gap may be rotated by each of the rollers to allow an entire shape of the capsule to be exposed to the vision part 40.

In this case, a controller 60 connected to the vision part 40 may determine whether the capsule is defective or not based on a captured image, count good-quality products and defective products, and control the discharge part 50 to separately discharge good-quality capsules and defective capsules.

Hereinafter, each of configurations will be described in more detail. The hopper part 10 may vibrate by a vibrator to allow the large amount of capsules to be continuously supplied to the moving part 20.

In this case, the hopper part 10 may randomly supply the large amount of capsules to the moving part at once without supplying the capsules one by one, and positions and an amount of the supplied capsules may be randomly provided.

Further, the hopper part 10 may be provided on one side thereof with a panel for adjusting a vibration intensity of the vibrator, a sensor for detecting a clogging state as the large amount of capsules are introduced at once, an alarm, and the like.

In addition, the moving part 20 may include rollers 21 connected to each other in a form of a conveyor while maintaining a separation gap 22 formed between two adjacent rollers 21 to prevent the capsule 2 from falling out, so that the large amount of capsules randomly supplied through the hopper part 10 may be seated in the separation gap 22 between the rollers 21 so as to be transferred to a discharge port.

In this case, the moving part 20 may include: a slope path 23 inclined at about 30 degrees to allow the capsules 2a overlapping each other to be easily distributed by the capsule alignment part 30, and a flat smooth path 24 in which the capsules placed in the separation gap 22 between the rollers are exposed to the vision part 40.

In addition, the moving part 20 may repeatedly perform going/stopping, and particularly, as shown in FIGS. 8, 9, 10, and 11, the rollers 21 may be rotated by the driving part 25 on the slope path 23, so that the capsules 2 may be easily and horizontally aligned and seated in the separation gap 22. Further, the rollers 21 may be rotated by the driving part 25 in the smooth path 24, so that the capsules horizontally aligned and seated in the separation gap 22 may be reversely rotated.

In this case, the driving part 25 having a plate shape and making contact with the roller may be installed at a bottom of the slope path or the smooth path, so that the moving part may repeatedly perform the going/stopping while each of the rollers makes contact with a driving plate, and thus the rollers making contact with the driving plate may be rotated/stopped according to the going/stopping of the moving part. In other words, when the moving part performs the going, the roller making contact with the driving plate may be rotated to allow the capsules disposed in the separation gap to rotate, and when a movement of the moving part is stopped, the rotation of the roller making contact with the driving plate may be stopped so that the vision part 2 may repeatedly perform an operation of capturing the large amount of capsules that are horizontally aligned by 2 or 3 times. In this case, in some embodiments, the driving part may be configured to rotate each of the rollers through another roller, a drum, or the like engaged with a bottom of each of the rollers.

In addition, as shown in FIG. 1, the capsule alignment part 30 may include a plurality of brushes 31 on the slope path 23 of the moving part 20, so that when capsules 2a seated in the separation gap 22 to overlap each other exist among the large amount of capsules randomly introduced by the hopper part 10, the capsules may be primarily caught by a brush 31a using a height difference, and the capsules may be distributed by a rotating brush 31b, and thus the capsules horizontally aligned and seated may be exposed to the vision part.

In this case, the brush 31 may ascend and descend according to a size and a type of the capsule by the controller 60, so that a distance between the roller 21 and the brush 31 may be adjusted.

In addition, the vision part 40 may be configured such that a vision 43 surrounded by front, rear, left, and right border walls 41 on the smooth path 24 and located at a center of the border walls 41 may capture a predetermined area. In this case, the border wall 41 may be configured as a light guide plate to perform surface light emission so as to capture the shape of the capsule with as uniform brightness as possible.

In other words, a lighting device 42 and the light guide plate may be provided to perform the surface light emission with as uniform brightness as possible so as to prevent the capsule from being shaded.

In addition, the vision part 40 may be connected to the controller 60 to count the good-quality or defective capsules among the large amount of capsules that are randomly introduced, and control the discharge part 50 to separately discharge the good-quality or defective capsules.

In this case, as shown in FIG. 2, the discharge part 50 may include a jumping unit 53 for spraying air into the separation gap 22 so that the defective capsule seated in the separation gap 22 may jump to a defective product discharge port 51 so as to be separately discharged, and a good-quality product discharge port 52 in which the good-quality product capsule seated in the separation gap is accommodated by a free fall scheme may be provided at a bottom of the defective product discharge port 51.

Figure 17:
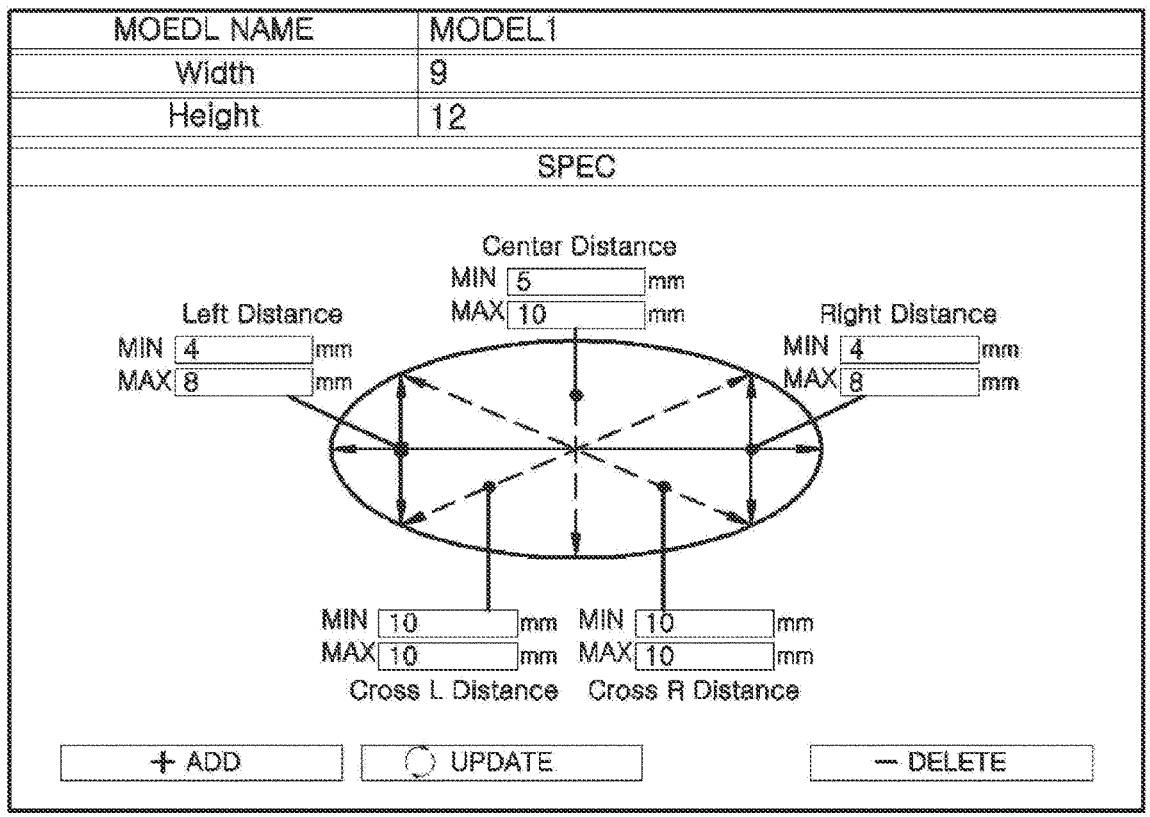
FIG. 17 is a setting screen of a controller of the capsule inspection system according to the embodiment of the present invention.

In addition, FIG. 17 shows a setting registration screen of the controller. When describing with reference to the drawing, the controller may open a setting screen for checking characteristics of a capsule or performing setting registration before inspecting the capsule for each model.

In this case, the opened setting screen may be used to perform setting registration of a vertical center height value (Center Distance) at a center of the capsule and vertical height values (Left Distance and Right Distance) at ⅓ of left and right points about the center of the capsule.

Further, each of the values may be setting-registered with error ranges (Min and Max) to manage a measurement value, and both diagonal lines (Cross L Distance and Cross R Distance) may be setting-registered to identify a curvature degree of the capsule based on a distance calculation scheme.

Figure 18:
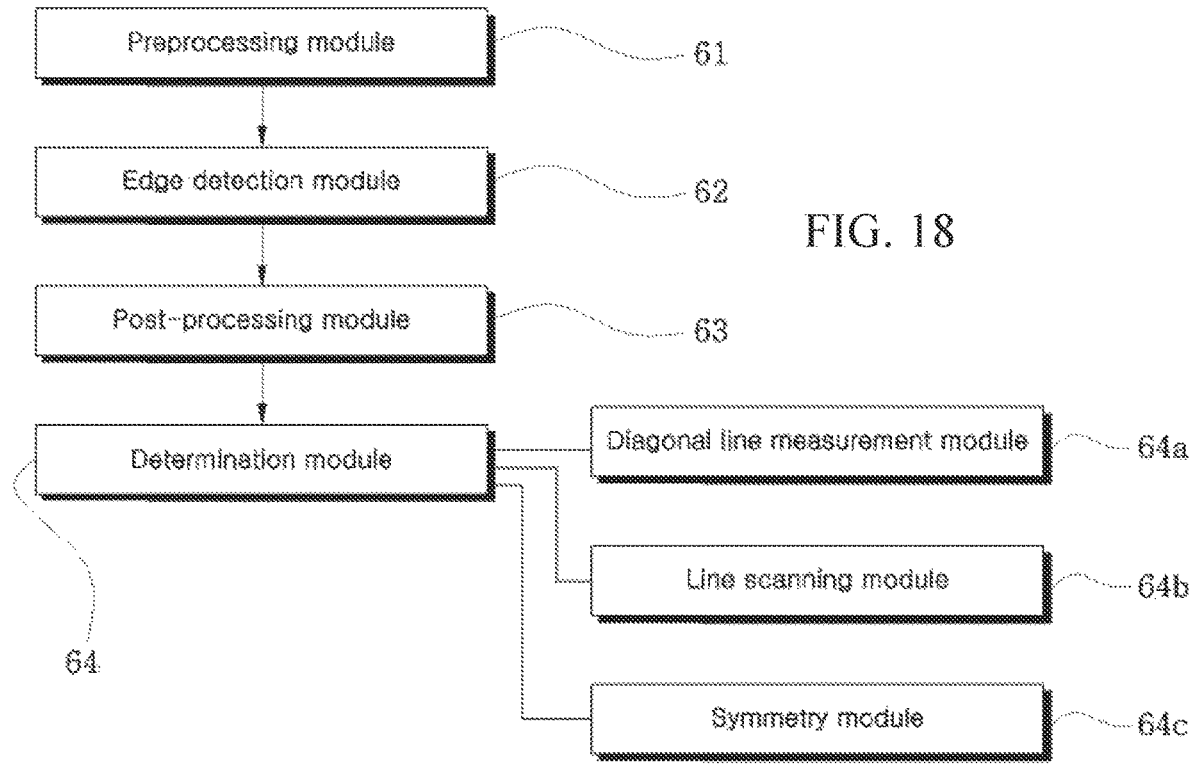
FIG. 18 is a block diagram showing the controller of the capsule inspection system according to the embodiment of the present invention.
Figure 19:
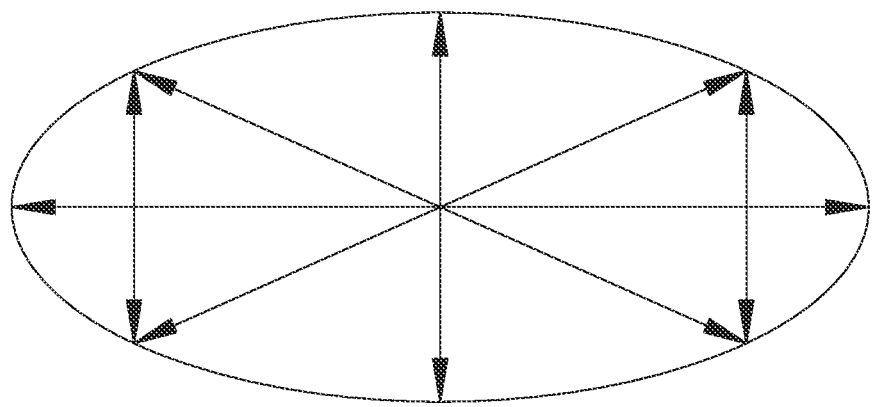
FIGS. 19, 20, and 21 are conceptual diagrams showing a determination algorithm according to the present invention.
Figure 20:
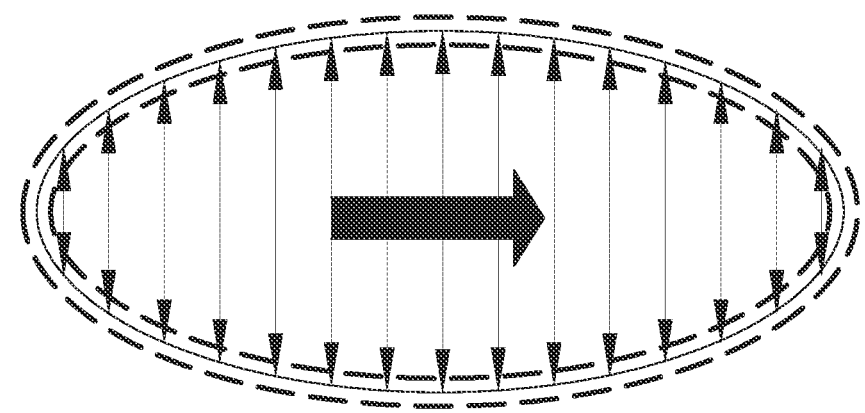
Figure 21:
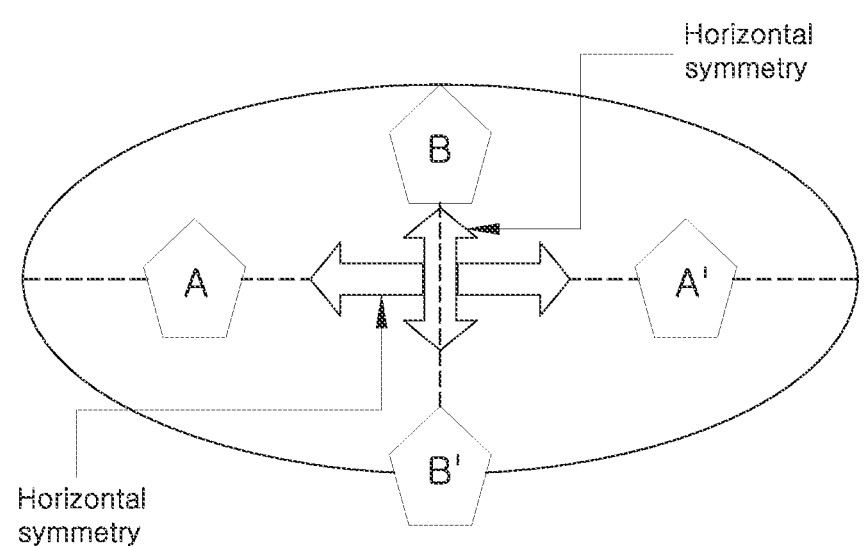
Figure 22:
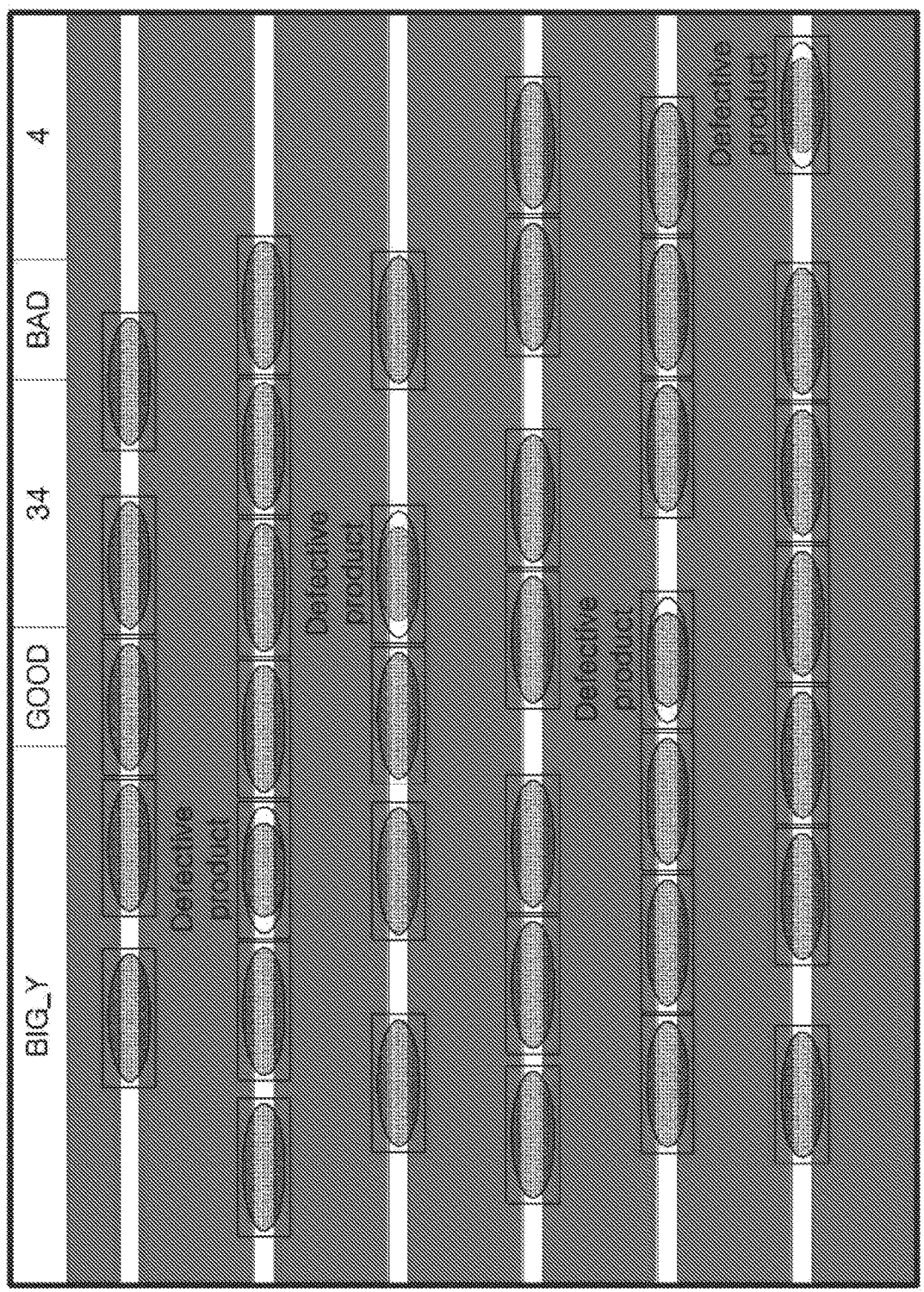
FIG. 22 is an output screen of the controller of the capsule inspection system according to the embodiment of the present invention.

In addition, FIG. 18 shows a configuration of the controller, FIGS. 19, 20, and 21 are views showing an algorithm for confirming whether the capsule is defective or not, and FIG. 22 shows an output screen of the controller.

When describing with reference to the drawings, the controller 60 may include a preprocessing module 61, an edge detection module 62, a post-processing module 63, and a determination module 64, and each of the modules may represent a functional and structural combination of hardware and software for describing the technical idea or a specific algorithm of the present invention.

In this case, the preprocessing module 61 may remove an unnecessary portion from the captured image according to a purpose of acquisition to obtain only necessary information, process information to highlight a feature value, or process the image to easily process information. Simply, for example, after the captured image is converted into gray scale, a memory may be allocated in a form of an array to correspond to a size of the captured image (e.g., 300×300), and a color value and the like may be called or updated based on a position value of each pixel.

Further, after a preprocessing operation is performed, the edge detection module 62 may perform a smoothing operation with a Gaussian filter to remove noise and enhance a contour, and may perform an operation of performing convolution on a mask to detect the contour. In this case, an operation of removing a non-maximum value to allow only a local maximum value to remain so as to remove a fake contour may be performed, and an operation of performing binarization based on a double threshold value to obtain a sharp edge and connecting edges to each other may be performed.

In addition, the post-processing module 63 may allow the roller, which serves as a background, to be recognized as a black color and perform inversion to allow the capsules horizontally aligned along the separation gap to have a property of a white color, and may partially extract only each of capsule regions that are horizontally aligned along the separation gap according to a morphology scheme based on setting-registered information of the capsule. Further, in some embodiments, extracted capsules may be marked on the captured image with a color by which the contour of the capsule is drawn, and a region of the extracted capsule may be marked with a red color so as to be immediately recognized by a manager.

Further, the determination module 64 may be a module for determining a good-quality or defective capsule, and may include a diagonal line measurement module 64a, a line scanning module 64b, and a symmetry module 64c. In some embodiments, the determination module 64 may include a text recognition module for identifying a marked character or the like, and the like.

In this case, as shown in FIG. 19, the diagonal line measurement module may measure a length value of a diagonal line for identifying a curvature degree by a Pythagorean theorem and a cosine law based on lateral and longitudinal lengths that are orthogonal to each other at a specific point based on setting-registered values of lateral and longitudinal length values. In addition, when the length value is within an error range of a diagonal line length value registered upon setting-registering of a model of the capsule, the capsule may be determined as the good-quality product, and when the length value is out of the error range, the capsule may be determined as the defective product.

In addition, as shown in FIG. 20, the line scanning module may measure a vertical length within the region of the capsule such that the length may be scanned from one side to another side to recognize an area value and a shape of the capsule, determine the capsule as the good-quality product when the vertical length is within an error range, and determine the capsule as the defective product when the vertical length is out or the error range.

Further, as shown in FIG. 21, the symmetry module may inspect whether the capsule has horizontal and vertical symmetry about a center of the capsule so as to detect a defect in both corners, which were difficult to be numerically confirmed. In this case, the capsule may be determined as the good-quality product when the capsule has symmetry, and the capsule may be determined as the defective product when the capsule has asymmetry.

Therefore, as shown in FIG. 22, the controller may allow the roller, which serves as the background, to be recognized as the black color and perform the inversion to allow the capsules horizontally aligned along the separation gap to have the property of the white color based on the image captured by the vision part, may mark the region and the contour of each of the capsules extracted through the post-processing module and the edge detection module, and may display the good-quality capsules and the defective products determined through the determination module and count the good-quality products and the defective products.

Figure 23:
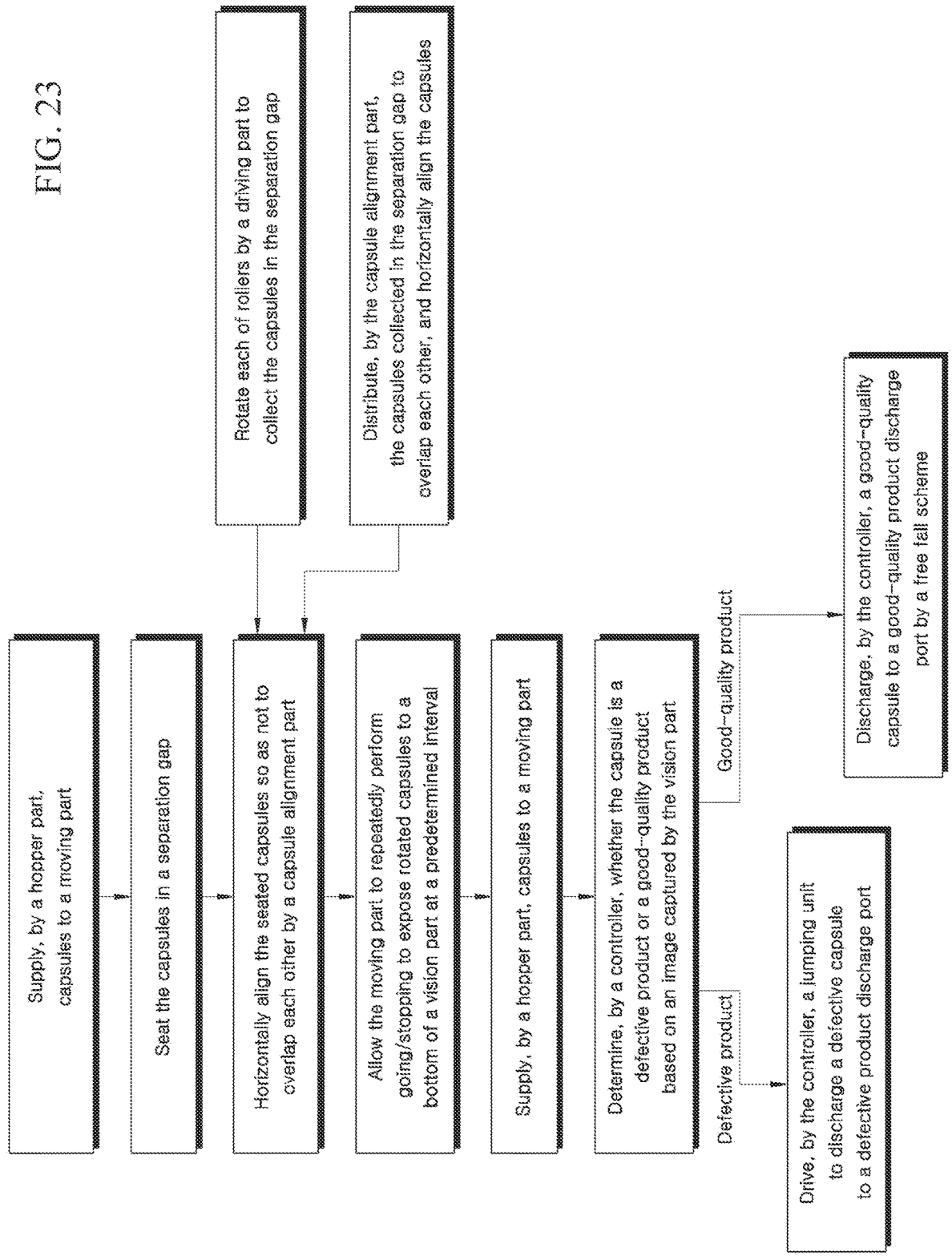
FIG. 23 is a flowchart of the capsule inspection system according to the embodiment of the present invention.

FIG. 23 is a view showing an operation process of the capsule inspection system according to the embodiment of the present invention.

When describing with reference to the drawing, according to the present invention, the large amount of capsules introduced by the hopper part 10 may be randomly supplied to the moving part 20 continuously by a vibration of the vibrator.

In this case, the moving part 20 may form the separation gap 22 between the rollers, so that the large amount of capsules that are randomly supplied may be seated in the separation gap.

In particular, the roller may start to rotate by the driving part, so that the capsules placed on the roller may be automatically collected and seated in the separation gap.

In addition, the moving part 20 may transfer the capsules seated in the separation gap to the discharge port.

In this case, the capsules collected in the separation gap to overlap each other may be distributed by the capsule alignment part 30 provided on the slope path of the moving part, so that the capsules may be horizontally aligned according to the separation gap.

In this case, the capsules horizontally aligned according to the separation gap may have irregular positions and a random amount, and particularly, the capsules may repeatedly perform going/stopping so as to be exposed to the vision part 40 provided in the smooth path of the moving part.

In this case, the vision part 40 may capture the shapes of the capsules that are randomly and horizontally aligned according to the separation gap, and particularly, when the moving part performs the going, each of the rollers may be rotated by the driving part to allow the capsules horizontally aligned in the separation gap to rotate, and when the moving part performs the stopping, the rotations of the rollers may be stopped so that the shapes of the rotated capsules may be exposed to the bottom of the vision part so as to be captured.

In addition, the controller 60 may recognize the capsules seated in the separation gap based on a still image captured while repeatedly performing the above operation by 2 or 3 times, and may perform comparative analysis on a measurement value of each of the capsules and a set distance value of the capsule to determine whether each of the capsules is the defective product or the good-quality product.

Further, when the capsule determined by the controller is defective, the jumping unit installed at a bottom of the roller around the discharge part may spray the air into the separation gap so that the capsule may jump to the defective product discharge port so as to be separately discharged, and when the capsules determined by the controller are normal, the capsules located in the separation gap may be discharged through the good-quality product discharge port by the free-fall scheme.

In this case, preferably, the jumping unit may be configured such that a plurality of spray holes are formed in left and right directions, and the spray holes are selectively opened and closed to spray the air into the separation gap so as to allow the seated capsule to jump, or may be configured such that an air gun moves along a rail formed in the left and right direction to selectively discharge the capsules seated in the separation gap, but embodiments are not limited thereto.

Figure 24:
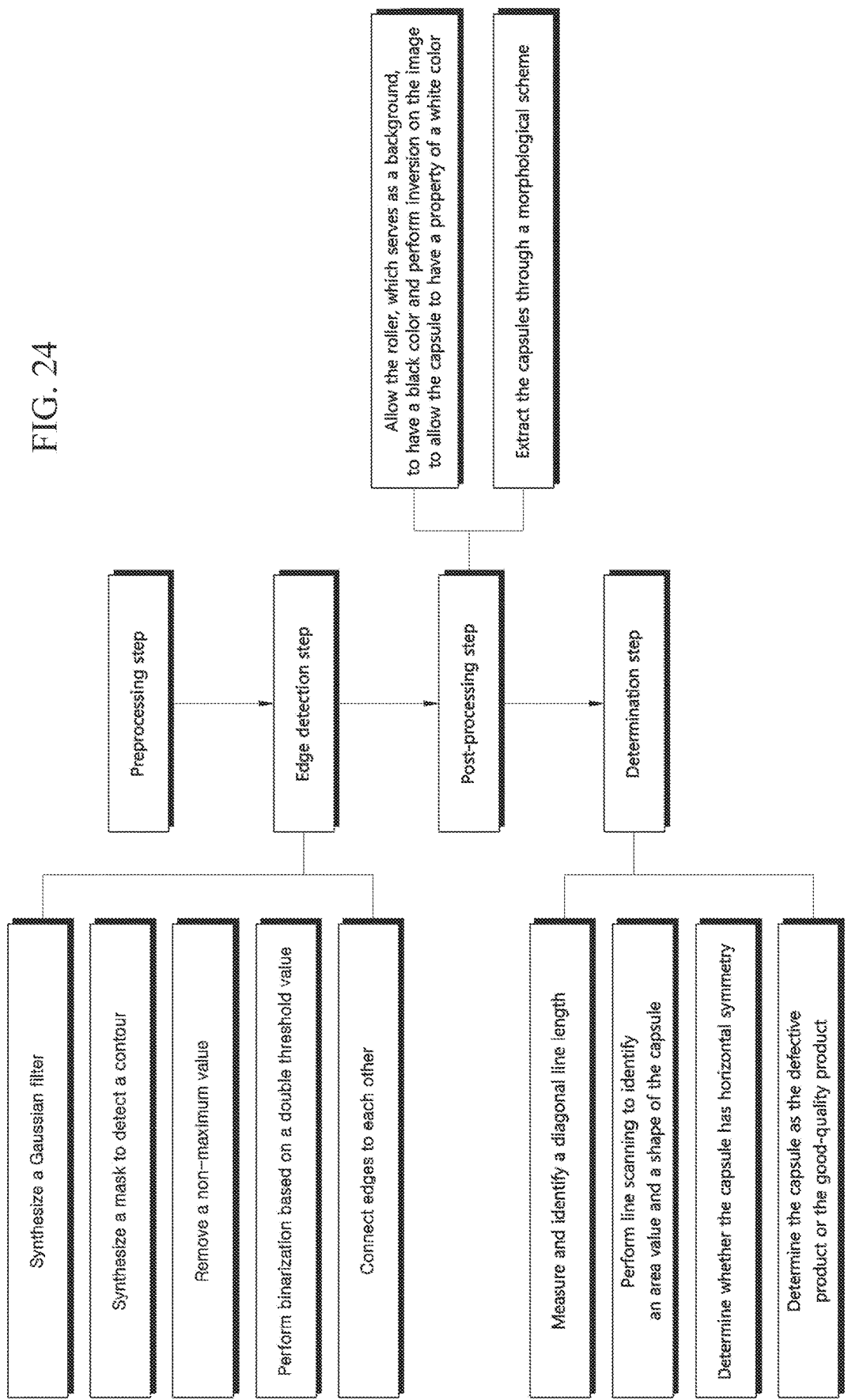
FIG. 24 is a flowchart showing a determination process of the controller.

In addition, FIG. 24 shows a process of determining, by the controller, whether the capsule is the good-quality product or the defective product based on the image captured through the vision part.

When describing with reference to the drawing, the controller 60 may perform a preprocessing operation of obtaining the image captured by the vision part, and removing an unnecessary portion to obtain only necessary information or easily processing information. In addition, an operation of detecting contour information of each of the capsules horizontally aligned in the separation gap based on preprocessed information may be performed. Further, a post-processing operation of partially extracting the capsules horizontally aligned along the separation gap may be performed. In addition, a process of determining whether each of the capsules is the defective product or the good-quality product by obtaining the measurement value of each of the capsules and performing the comparative analysis on the set distance value of the capsule may be performed.

In this case, according to the preprocessing operation, the image captured through the vision may be converted into gray scale. In this case, a memory may be allocated in a form of an array to correspond to a size of the captured image, and a color value of a pixel may be stored in a region corresponding to a coordinate value of each pixel.

In this case, in some embodiments, the preprocessing operation may include a process of setting-registering information on a model (e.g., a size, an area, a lateral length, a longitudinal length, a diagonal line length, and the like of the capsule) when the model of a specific capsule is inspected.

In addition, the operation of detecting the contour information may perform the smoothing operation with the Gaussian filter to remove the noise and enhance the contour, and may perform the operation of performing the convolution on the mask to detect the contour after the preprocessing operation is performed. In this case, the operation of removing the non-maximum value to allow only the local maximum value to remain so as to remove the fake contour may be performed, and the operation of performing the binarization based on the double threshold value to obtain the sharp edge and connecting the edges to each other may be performed.

Further, the post-processing operation may allow the roller, which serves as the background, to be recognized as the black color and perform the inversion to allow the capsules horizontally aligned along the separation gap to have the property of the white color, and may partially extract each of capsules according to the morphology scheme based on the setting-registered information of the capsule, and measure a number of the capsules.

In addition, a determination operation may measure the length value of the diagonal line for identifying the curvature degree based on the lateral and longitudinal lengths that are orthogonal to each other at the specific point of the contour of the capsule by the Pythagorean theorem and the cosine law. In addition, when the length value is within the error range of the length value input upon the setting-registering of the model of the capsule, the capsule may be determined as the good-quality product, and when the length value is out of the error range, the capsule may be determined as the defective product. Further, the vertical length may be measured within the region of the capsule such that the length may be scanned from one side to another side to recognize the area value and the shape of the capsule, the capsule may be determined as the good-quality product when the vertical length is within the error range, and the capsule may be determined as the defective product when the vertical length is out or the error range. In addition, the defect in both corners, which were difficult to be numerically confirmed, may be detected by inspecting whether the capsule has the horizontal and vertical symmetry about the center of the capsule. In this case, the capsule may be determined as the good-quality product when the capsule has symmetry, and the capsule may be determined as the defective product when the capsule has asymmetry. During the post-processing operation, a number of the good-quality products and a number of the defective products may be measured and confirmed based on a number of the measured capsules.

What is claimed is:

1. A capsule inspection system, wherein the capsule inspection system includes:
    a hopper part for randomly introducing a plurality of capsules into a moving part,
    wherein the moving part includes a plurality of rollers consecutively connected to each other while maintaining a separation gap that prevents the capsule from falling out of place, so that the plurality of capsules randomly introduced by the hopper part are seated in the separation gap between the rollers so as to be transferred to a discharge part,
    a capsule alignment part for horizontally aligning the plurality of capsules, which are randomly introduced, in the separation gap;
    a vision part for capturing shapes of the capsules that are horizontally and irregularly aligned in the separation gap by the capsule alignment part; and
    a controller for determining whether the capsule is a good-quality capsule or a defective capsule based on an image captured by the vision part provided on an upper portion of the moving part,
    wherein the moving part repeatedly performs going/stopping at a predetermined speed to allow each of the rollers to be rotated/stopped by a driving part, such that when the moving part performs the going, each of the rollers is rotated by the driving part to allow the capsules horizontally aligned in the separation gap to rotate, and when the moving part performs the stopping, the rotations of the rollers are stopped so that shapes of the rotated capsules are exposed to a bottom of the vision part in a stopped state so as to be captured and inspected, and
    wherein the horizontally aligning, by the capsule alignment part, of the capsules seated in the separation gap such that the capsules do not overlap each other includes:
        rotating each of the rollers by the driving part to collect the capsules seated on the rollers in the separation gap; and
        distributing, by a height-difference or rotating brush of the capsule alignment part, the capsules that are collected in the separation gap to overlap each other, and horizontally aligning the capsules along the separation gap.

2. The capsule inspection system of claim 1, wherein the capsule alignment part includes:
    a slope path inclined to allow the capsules to be easily distributed; and
    a smooth path for safely transferring the capsules seated in the separation gap to a discharge port so as to allow the capsules to be exposed to the bottom of the vision part, and
    wherein the capsules located in the smooth path repeatedly perform going/stopping so as to be exposed to the bottom of the vision part while being rotated at a predetermined interval.

3. The capsule inspection system of claim 2, wherein the driving part is installed at bottoms of the slope path and the smooth path, and
    wherein the driving part:
        has a plate shape and makes contact with the roller, and
        is configured to rotate each of the rollers through a drum engaged with a bottom of each of the rollers.

4. The capsule inspection system of claim 1, wherein the discharge part includes:
    a jumping unit for spraying air into the separation gap so that the defective capsule seated in the separation gap jumps to a defective product discharge port so as to be separately discharged when the moving part repeatedly performs the going/stopping; and
    a good-quality product discharge port in which the good-quality capsule seated in the separation gap is accommodated by a free fall scheme is provided at a bottom of the defective product discharge port.

5. The capsule inspection system of claim 3, wherein the slope path is configured such that the roller is rotated by the driving part to allow the plurality of capsules introduced by the hopper part to be collected in the separation gap between the rollers and to allow the capsules to be seated so as to be horizontally aligned.

6. A capsule inspection method comprising:
    randomly supplying a plurality of capsules introduced by a hopper part to a moving part that moves in a predetermined trajectory;
    seating the plurality of capsules, which are randomly supplied, in a separation gap between rollers of the moving part that repeatedly performs going/stopping;
    horizontally aligning, by a capsule alignment part, the capsules seated in the separation gap such that the capsules do not overlap each other;

rotating, when the moving part performs the going, each of the rollers by a driving part to allow the capsules horizontally aligned in the separation gap to rotate;

stopping, when the moving part performs the stopping, the rotations of the rollers to allow a vision part to capture shapes of the rotated capsules;

determining, by a controller, whether the capsule is a defective product or a good-quality product based on an image captured by the vision part;

driving, by the controller, a jumping unit to allow a defective capsule seated in the separation gap to jump so as to be discharged to a defective product discharge port; and discharging a good-quality capsule to a good-quality product discharge port by a free fall scheme, wherein the horizontally aligning, by the capsule alignment part, of the capsules seated in the separation gap such that the capsules do not overlap each other includes:

rotating each of the rollers by the driving part to collect the capsules seated on the rollers in the separation gap; and distributing, by a height-difference or rotating brush of the capsule alignment part, the capsules that are collected in the separation gap to overlap each other, and horizontally aligning the capsules along the separation gap.

7. The method of claim 6, further comprising:

a preprocessing step of obtaining, by the controller, the image captured by the vision part, and removing an unnecessary portion to obtain only necessary information or processing the image to easily process information;

an edge detection step of obtaining contour information of each of the capsules based on information obtained through the processing in the preprocessing step;

a post-processing step of partially extracting the capsules horizontally aligned along the separation gap; and determining whether each of the capsules is the defective product or the good-quality product by obtaining a measurement value of each of the capsules and performing comparative analysis on a set length value of the capsule.

8. The method of claim 7, wherein the edge detection step includes:

synthesizing a Gaussian filter to preprocessed information so as to remove noise and enhance a contour;

synthesizing a mask to detect the contour;

removing a non-maximum value to allow only a local maximum value to remain;

performing binarization based on a double threshold value to obtain a sharp edge; and removing an unnecessary edge, and connecting edges including only actual capsule information to each other.

9. The method of claim 7, wherein the post-processing step includes:

allowing the roller, which serves as a background, to be recognized as a black color, and performing inversion to allow the capsules horizontally aligned along the separation gap to have a property of a white color; and partially extracting each of the capsules according to a morphology scheme based on setting-registered information of the capsule.

10. The method of claim 7, wherein the determining of whether each of the capsules is the defective product or the good-quality product by obtaining the measurement value of each of the capsules and performing the comparative analysis on the set length value of the capsule includes:

identifying a length value of a diagonal line for identifying a curvature degree through a Pythagorean theorem and a cosine law based on lateral and longitudinal lengths that are orthogonal to each other at a specific point of the capsule after contour extraction;

measuring a vertical length within a region of the capsule such that the length is line-scanned from one side to another side to identify an area value and a shape of the capsule after the contour extraction;

determining whether the capsule has horizontal and vertical symmetry about a center of the capsule after the contour extraction;

determining the capsule as the good-quality capsule when a determination result is within an error range, and determining the capsule as the defective capsule when the determination result is out of the error range; and counting, by the controller, the good-quality capsule and the defective capsule, and displaying an inspection result.

* * * * *